United States Patent [19]

Ichinoi

[11] Patent Number: 4,979,025

[45] Date of Patent: Dec. 18, 1990

[54] CARRIER CHROMINANCE SIGNAL PROCESSING CIRCUIT

[75] Inventor: Yutaka Ichinoi, Yokohama, Japan

[73] Assignee: Victor Company of Japan, Ltd., Yokohama, Japan

[21] Appl. No.: 239,593

[22] Filed: Sep. 1, 1988

[30] Foreign Application Priority Data

Sep. 4, 1987 [JP] Japan ............................ 62-222786

[51] Int. Cl.⁵ .............................................. H04N 9/68
[52] U.S. Cl. .................................................... 358/40
[58] Field of Search ................ 358/40, 27, 31, 23, 358/25, 327, 329, 330

[56] References Cited

U.S. PATENT DOCUMENTS

| 4,723,175 | 2/1988 | Ichinoi | 358/31 |
| 4,729,014 | 3/1988 | Flamm | 358/40 |
| 4,766,486 | 8/1988 | Ozaki | 358/40 |

FOREIGN PATENT DOCUMENTS 1562170  8/1970  Fed. Rep. of Germany .

OTHER PUBLICATIONS

"Picture Signal Improvement in Colour TV Receivers" by H. Harlos, IEEE Trans. on Consumer Electronics, vol. CE-31, No. 3, 156-162, Aug., 1985.

Primary Examiner—Tommy P. Chin
Attorney, Agent, or Firm—Michael N. Meller

[57] ABSTRACT

A carrier chrominance signal processing circuit comprises first through fourth circuits. The first circuit detects an edge of color in an input carrier chrominance signal. The second circuit holds color information on the carrier chrominance signal in a vicinity of the edge of color. The third circuit produces a control signal having a predeterined pulse width in response to the detected edge of color. The fourth circuit selects a held color information when the control signal is produced, and selects the carrier chrominance signal when no control signal is produced, so that a steepened carrier chrominance signal is outputted from the fourth circuit.

14 Claims, 10 Drawing Sheets

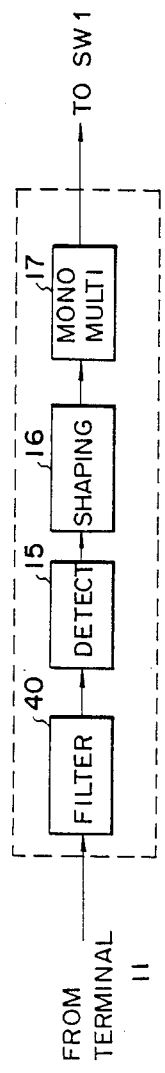
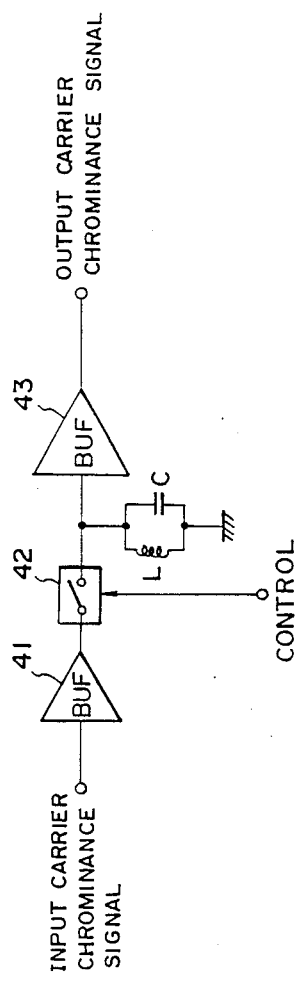

CARRIER CHROMINANCE SIGNAL PROCESSING CIRCUIT

BACKGROUND OF THE INVENTION

The present invention generally relates to a carrier chrominance signal processing circuit, and in particular to a carrier chrominance signal processing circuit for steepening an edge of a carrier chrominance signal to obtain a sharp chrominance signal.

Conventionally, a circuit for steepening a chrominance signal to obtain a sharp picture is known. Such a circuit has been disclosed in Harmut Harlos, "PICTURE SIGNAL IMPROVEMENT IN COLOUR TV RECEIVERS", IEEE Transactions on Consumer Electronics, Vol. CE-31, No.3, pp 156–162, August 1985, for example. The disclosed circuit is intended to detect an edge of each of the color difference signals (R−Y) and (B−Y), and to then hold a signal component at the time of the beginning of the detected edge during a time when the edge is falling or rising. For example, assuming that an edge of an input signal shown in FIG. 1(a) is supplied to the above prior circuit, the circuit holds information on the input signal indicated by a circle "o" during a time indicated by an arrow. After that, the input signal is passed through the circuit at it is. Thereby, an output signal of the circuit as shown in FIG. 1(b) is obtained. As shown, a rising waveform of the output signal has been steepened, or in other words, the edge of the input signal of FIG. 1(a) has been steepened.

However:, the prior circuit is designed so as to process the color difference signals (R−Y) and (B−Y) which are obtained by decoding the carrier chrominance signal. For this reason, the prior circuit cannot handle a carrier chrominance signal as it is. In case where the prior circuit is applied to a system which handles a chrominance signal as a carrier chrominance signal such as a video tape recorder in conformity with a low-frequency band conversion color television system, the carrier chrominance signal must be demodulated, and then the demodulated chrominance signal must be supplied to the prior circuit. Additionally, the output signal of the prior circuit is further modulated in order to supply the steepened chrominance signal to the original signal line. Consequently, a complicated circuit structure is necessary to achieve the above signal processing.

SUMMARY OF THE INVENTION

Accordingly, a general object of the present invention is to provide a novel and useful carrier signal processing circuit in which the above disadvantages are eliminated.

A more specific object of the present invention is to provide a carrier signal processing circuit capable of steepening the carrier chrominance signal to thereby obtain sharp pictures.

The above objects of the present invention are achieved by a carrier chrominance signal processing circuit including first through fourth circuits. The first circuit detects an edge of color in an input carrier chrominance signal. The second circuit holds color information on the carrier chrominance signal in a vicinity of the edge of color. The third circuit produces a control signal having a predetermined pulse width in response to the detected edge of color. The fourth circuit selects a held color information when the control signal is produced, and selects the carrier chrominance signal when no control signal is produced, so that a steepened carrier chrominance signal is outputted from the fourth circuit.

Other objects, features and advantages of the present invention will become apparent from the following detailed description when read in conjunction with the accompanying drawings.

BRIEF DESCRIPTION OF THE DRAWINGS

FIG. 9 is a block diagram of a variation of a color detecting circuit which may be used in the embodiments;

FIG. 10 shows an example of a delay circuit which may be used n the embodiments;

DETAILED DESCRIPTION

Figure 1:
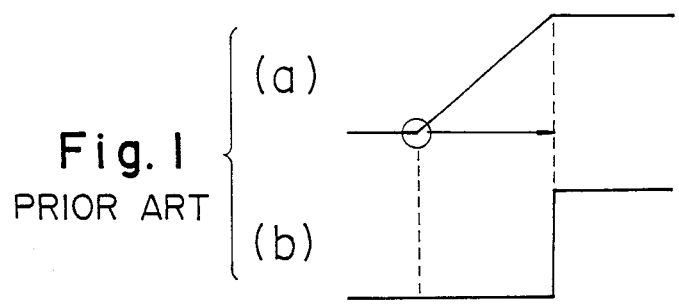
FIG. 1 shows waveforms for explaining the conventional circuit for steepening an edge of the chrominance signal.
Figure 2:
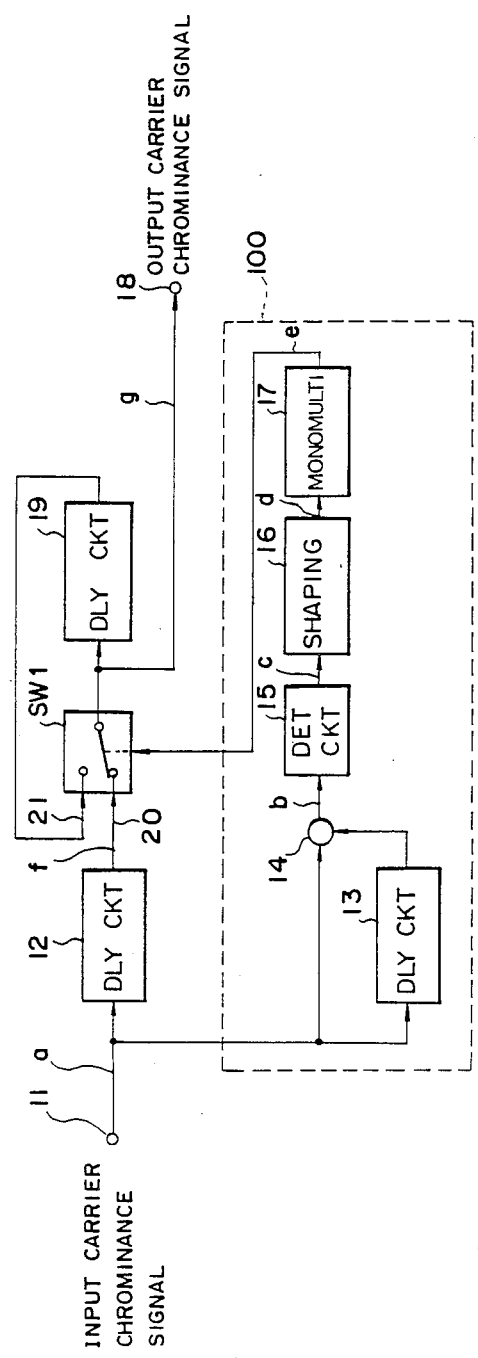
FIG. 2 is a block diagram of the first embodiment of the present invention.
Figure 3:
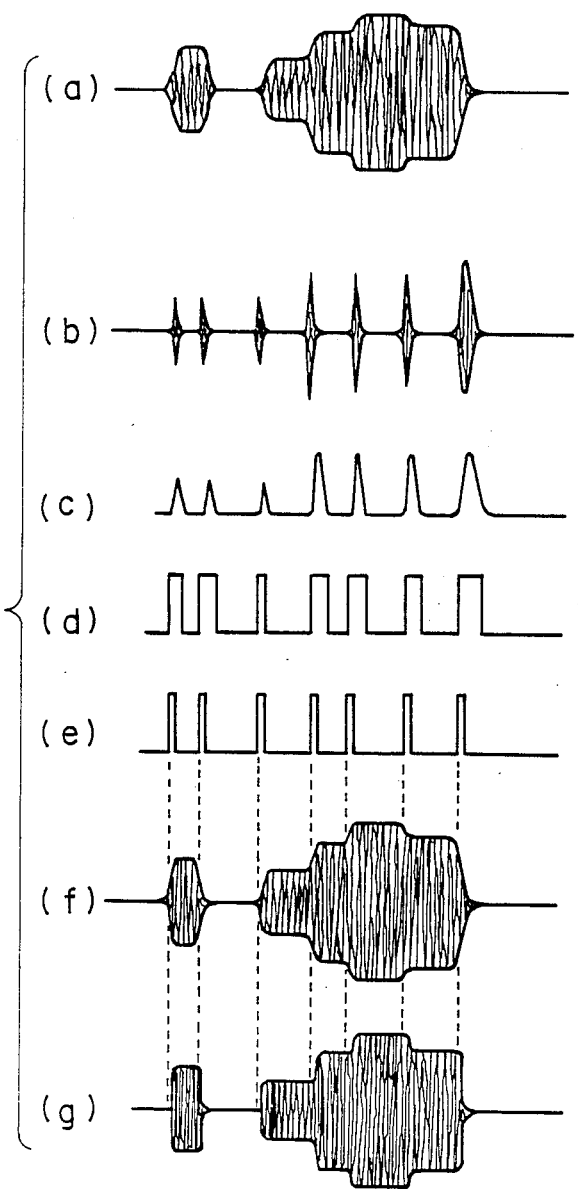
FIG. 3 shows signal waveforms at different portions of the block diagram of FIG. 2.

Referring to FIG. 2, an input carrier chrominance signal is applied to a delay circuit 12 and a color detecting system (which may be referred to as an edge detecting system) 100 through an input terminal 11. The carrier chrominance signal has a waveform as shown in FIG. 3(a). Waveforms indicated by letters "a" through "g" of FIG. 3 correspond to waveforms obtained at portions indicated by letters "a" through "g" shown in FIG. 2. The delay circuit 12 is used for compensating a delay of time between input and output terminals of the color detecting system 100. The carrier chrominance signal supplied to the color detecting system 100 is received by a delay circuit 13 provided therein. The delay circuit 13 is a delay line having a delay amount corresponding to an integer multiple of the period of a chrominance subcarrier signal or to an odd number multiple of a half of the period of the chrominance subcarrier signal. The carrier chrominance signal at the input terminal 11 and an output signal of the delay circuit 13 are supplied to a calculation circuit 14. The calculation circuit 14 executes a subtracting operation for the two input signals in the case where the delay circuit 13 has the delay amount corresponding to an integer multiple of the period of the chrominance subcarrier signal. On the other hand, the calculation circuit 14 executes an adding operation for the two input signals in the case where the delay circuit has the delay amount corresponding to an odd number multiple of a half of the period of the chrominance subcarrier signal. Therefore, when the chrominance subcarrier signal has a small correlation of colors in a line, or in other words at an edge of color, the calculation circuit 14 produces an output signal. For example, when the carrier chrominance signal shown in FIG. 3(a) is supplied to the input terminal 11, a waveform shown in FIG. 3(b) is obtained at the output terminal of the calculation circuit 14.

The output signal of the calculation circuit 14 is fed to a detection circuit 15. When the signal waveform shown in FIG. 3(b) is detected by the detection circuit 15, a signal waveform shown in FIG. 3(c) is obtained at an output terminal thereof. The output signal of the detection circuit 15 is then waveform-shaped by a waveform shaping circuit 16. For example, the waveform shaping circuit 16 produces a signal waveform of FIG. 3(d) from the waveform shown in FIG. 3(c). The output signal of the waveform shaping circuit 16 is supplied to a monostable multivibrator 17, which is triggered by the output signal of the waveform shaping circuit 16, and then produces a pulse signal having a predetermined duration time (pulse width). The monostable multivibrator 17 may be constructed by 74LS221 which is one of TTL standard series ICs. The reason why the monostable multivibrator 17 is used, is described in detail later. The monostable multivibrator 17 produces a pulse signal of FIG. 3(e) in response to the signal of FIG. 3(d).

On the other hand, the carrier chrominance signal passed through the delay circuit 12 is supplied to an input terminal 20 of a switch SW1. The switch SW1 may be constructed by TA7347P, which is manufactured by TOSHIBA CORPORATION. The pulse signal of FIG. 3(e) produced by the monostable multivibrator 17 is applied to a control terminal of the switch SW1 as a control signal. When the control signal is kept at a low level (hereafter simply referred to as "L"), the switch SW1 connects it output terminal to the input terminal 20. On the other hand, when the control signal is kept at a high level (hereafter simply referred to as "H"), the output terminal is connected to an input terminal 21 of the switch SW1. During the time when the color detecting system 100 detects a signal portion other than an edge of color, the delayed carrier chrominance signal supplied from the delay circuit 12 is supplied directly to an output terminal 18 of the carrier chrominance signal processing circuit.

The output signal of the switch SW1 is also fed to a delay circuit 19, which has a delay amount corresponding to an integer multiple of the period of the chrominance subcarrier signal. The delay circuit 19 may also be constructed by a ladder network composed of inductors and capacitors. An output signal of the delay circuit 19 is supplied to the input terminal 21 of the switch SW1. At an edge of color, as shown in FIG. 3(e), the control signal applied to the switch SW1 is switched to "H", so that the output terminal of the switch SW1 is supplied with the signal from the input terminal 21. During this time, or at the edge of color, a portion of the carrier chrominance signal which was kept in the delay circuit 19 immediately before the switch SW1 is switched to the input terminal 21, is repetitively outputted by a period corresponding to an integer multiple of of the period of the chrominance subcarrier signal. That is, color information just prior to the edge of the carrier chrominance signal is available at the output terminal 18.

The output waveform thus produced is as shown in FIG. 3(g). As shown, a change of color has been steepened by holding the color information immediately prior to the edge during the transient time.

A description is given of the reason why the output pulse of the waveform shaping circuit 16 in the color detecting system 100 is changed to the signal having the constant pulse width shown in FIG. 3(e) by the monostable multivibrator 17.

It is now assumed that the monostable multivibrator 17 is not provided in the color detecting system 100, or in other words, the output signal of the waveform shaping circuit 16 is supplied directly to the switch SW1. When a change of color in the carrier chrominance signal is relatively small, the output pulse of the waveform shaping circuit 16 has a relatively short pulse width. On the other hand, when a change of color is relatively great, the waveform shaping circuit 16 produces the output pulse having a relatively long pulse width. Hence, the color information immediately before the edge of the carrier chrominance signal is held for a considerably long time, and therefore a deviation in time between a luminance signal and the carrier chrominance signal becomes great. Further, a difference in time between a signal portion having a relatively great change of color and a signal portion having a relatively small change of color becomes great. As a result, the picture quantity on a CRT display which is reproduced from the carrier chrominance signal having the above signal portions is degraded.

Figure 4:
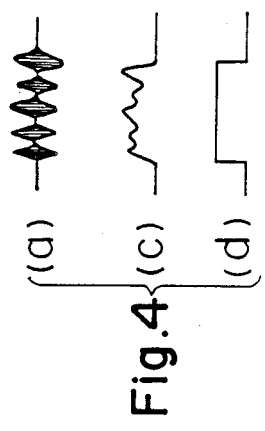
FIG. 4 shows signal waveforms at different portions of block diagram of FIG. 2.

Moreover, as shown in FIG. 4(a), when the carrier chrominance signal is changing frequently and slightly in level, a corresponding output signal of the detection circuit 15 may be kept at "H" during the entire time, as shown in FIG. 4(d). This results from an integral operation with respect to the signal of FIG. 4(a) which is performed in the detection circuit 15, as shown in FIG. 4(c). In this case, color information contained in the signal of FIG. 4(a) is completely lost.

From the above viewpoints, the present embodiment employ the monostable multivibrator 17. An appropriate pulse width in the order of several hundred nanoseconds of the output of the monostable multivibrator 17 contributes to steepening the carrier chrominance signal to thereby sharp edges of colors, while the above-described inconveniences are depressed.

Figure 5:
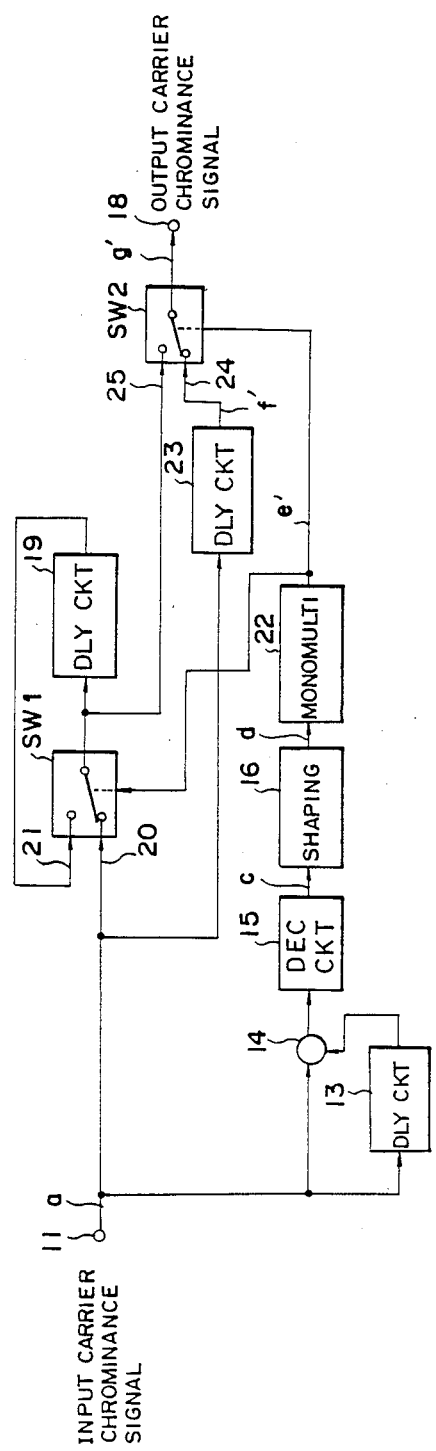
FIG. 5 is a block diagram of the second embodiment of the present invention.

In the first embodiment described above, color information just prior to an edge of color is kept during the transient time of the carrier chrominance signal. Alternatively, it is also possible to hold color information on a rear portion of an edge of color. Such an embodiment (second embodiment) is described below with reference to FIGS. 5 and 6. In FIG. 5, structural elements identical to those in FIG. 2 are indicated by the identical reference numerals.

Figure 6:
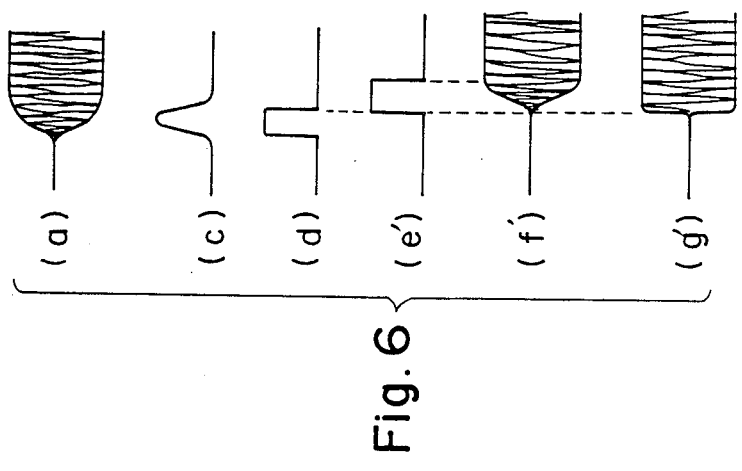
FIG. 6 shows signal waveforms at different portions of the block diagram of FIG. 5.

Referring to FIG. 5, a monostable multivibrator 22 is triggered by the fall of the output signal of the waveform shaping circuit 16, and then produces an output pulse signal as shown in FIG. 6(e'). The position at the beginning of this pulse corresponds to the position at the end of an edge of the input carrier chrominance signal of FIG. 6(a). Color information at the end of the edge of the input carrier chrominance signal is held by the delay circuit 19 while the pulse of FIG. 6(e') is kept at "H". On the other hand, the input carrier chrominance signal of FIG. 6(a) is delayed by a delay circuit 23 as shown in FIG. 6(f). A switch SW2 is switchable between a delayed signal derived from the delay circuit 23 and the output signal of the delay circuit 19 through the switch SW1, in accordance with the control signal of FIG. 6(e'). An output signal of FIG. 6(g') obtained at the output terminal 18 is a steepened carrier chrominance signal in which information on the rear portion of color is held during the transient time of the edge of color.

Figure 8:
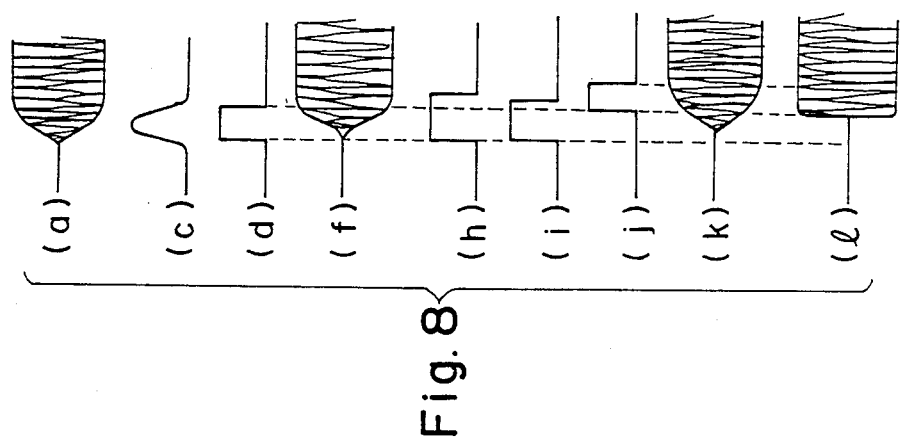
FIG. 8 shows signal waveforms at different portions of the block diagram of FIG. 7.
Figure 7:
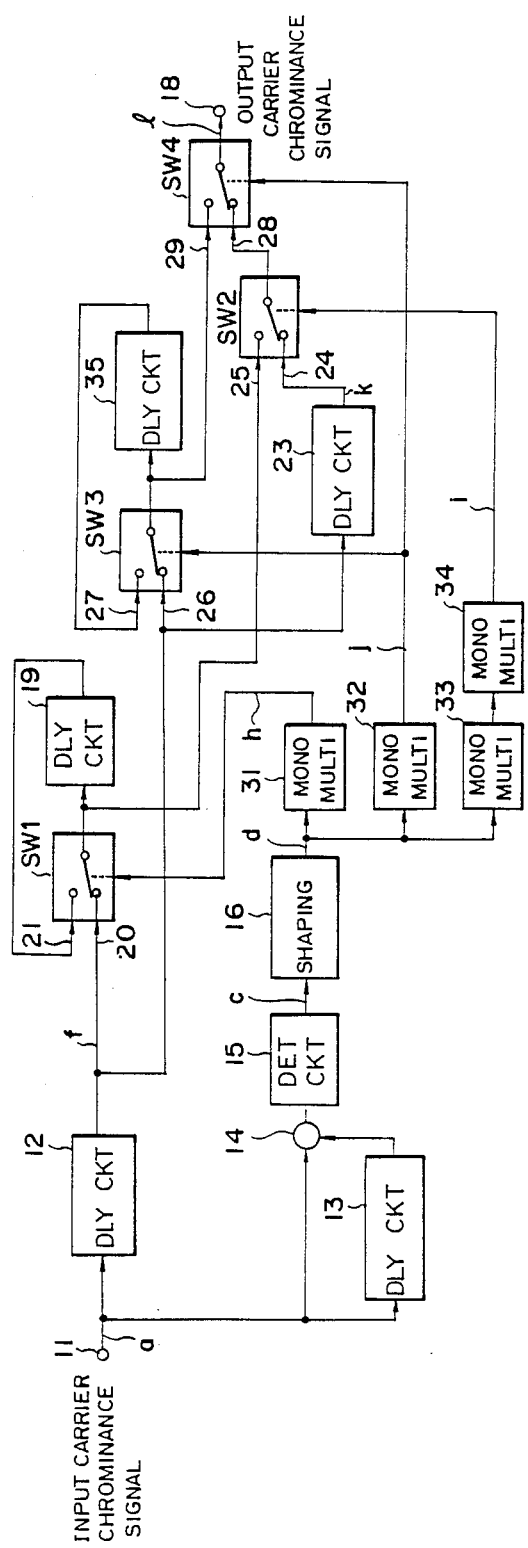
FIG. 7 is a block diagram of the third embodiment of the present invention.

A description is given of a variation (third embodiment) obtained by combining a combination of the first and second embodiments, by referring to FIGS. 7 and 8. In FIG. 7, reference numerals identical to those in the previous figures indicate the same structural parts.

The output signal of the waveform shaping circuit 16 shown in FIG. 8(d) is supplied to monostable multivibrators 31, 32 and 33. As described before, the output signal of the waveform shaping circuit 16 is obtained by producing the pulse signal indicating the edge of color and then subjecting the pulse signal to the waveform shaping process. The monostable multivibrator 31 produces a pulse signal having a relatively long duration of time shown in FIG. 8(h). The output pulse signal of the monostable multivibrator 31 is supplied to the switch SW1, so that color information just prior to an edge of color can be held by the delay circuit 19 and the switch SW1. The held color information is supplied to the input terminal 25 of the switch SW2.

A pulse signal of FIG. 8(j) derived from the monostable multivibrator 32 controls a switch SW3. An input terminal 26 of the switch SW3 receives the output signal of the delay circuit 12, and another input terminal 27 thereof receives an output signal of a delay circuit 35. The switch SW3 is switchable between the two input signals by the output pulse signal from the monostable multivibrator 32. The delay circuit 35 and the switch SW3 is used for holding information on the rear portion of an edge of color. The output signal of the switch SW3 having the held information on the rear portion of the edge is supplied to one input terminal 29 of a switch SW4. Another input terminal 28 of the switch SW4 is connected to the output terminal of the switch SW2. The monostable multivibrators 33 and 34 produces a pulse signal as shown in FIG. 8(i). This pulse signal is fed to the switch SW2 as the control signal. The switch SW2 outputs information immediately prior to the edge which is held by the delay circuit 19 during the time substantially corresponding to the former half of the transient duration of the edge of the chrominance signal (FIG. 8(k)) which has been delayed by the delay circuit 23. The above output signal which passes through the switch SW2 is supplied to the input terminal 28 of the switch SW4. The switch SW4 is controlled by the output signal (FIG. 8(j)) of the monostable multivibrator 32 so that it outputs color information immediately after the edge which is held by the delay circuit 35, during the time substantially corresponding to the latter half of the transient period of the edge of the carrier chrominance signal. As a result, as shown in FIG. 8(l), the output carrier chrominance signal obtained at the output terminal 18 is substituted with color information before and after the edge thereof during the former and latter halves of the transient period. As a result, the output carrier chrominance signal can be steepened. Particularly, it becomes possible to reduce a difference in time between a boundary between slightly different colors which cannot be detected by the first embodiment and the steepened edge of color.

In the aforementioned embodiments, the combination of the delay circuit 13 and the calculation circuit 14 may be substituted with a band-stop filter of a narrow band width for suppressing the chrominance subcarrier signal. A color detecting system employing a band-stop filter 40 is illustrated in FIG. 9. Further, the carrier chrominance signal may be held by a circuit configuration shown in FIG. 10 in place of the combination of the delay circuit 19 and switch SW1. Referring to FIG. 10, the input carrier chrominance signal is supplied to a switch 42 through an input buffer 41. The control signal derived from the monostable multivibrator 22 for example, is supplied to the switch 42. The switch 42 is turned OFF in response to application of the control signal applied thereto during the transient time of an edge of color. A resonance circuit which consists of an inductor L and a parallel capacitor C and which is tuned to the chrominance carrier frequency, is connected to an output terminal of the switch 42. When the switch 42 is turned OFF, an extremely increased impedance is obtained at an end of the LC resonance circuit. Therefore, the ringing due to the LC resonance circuit attenuates slowly. Thus, it is possible to use the ringing as a signal (delayed carrier chrominance signal) which holds color information at the edge of the input carrier chrominance signal.

Moreover, it is also possible to detect an edge of the carrier chrominance signal by using the luminance signal. This is based on the known fact that the chrominance signal and the luminance signal have the strong correlation. In case where the luminance signal is used in place of the chrominance signal, the following specific advantage is obtained. This is described below.

Figure 11:
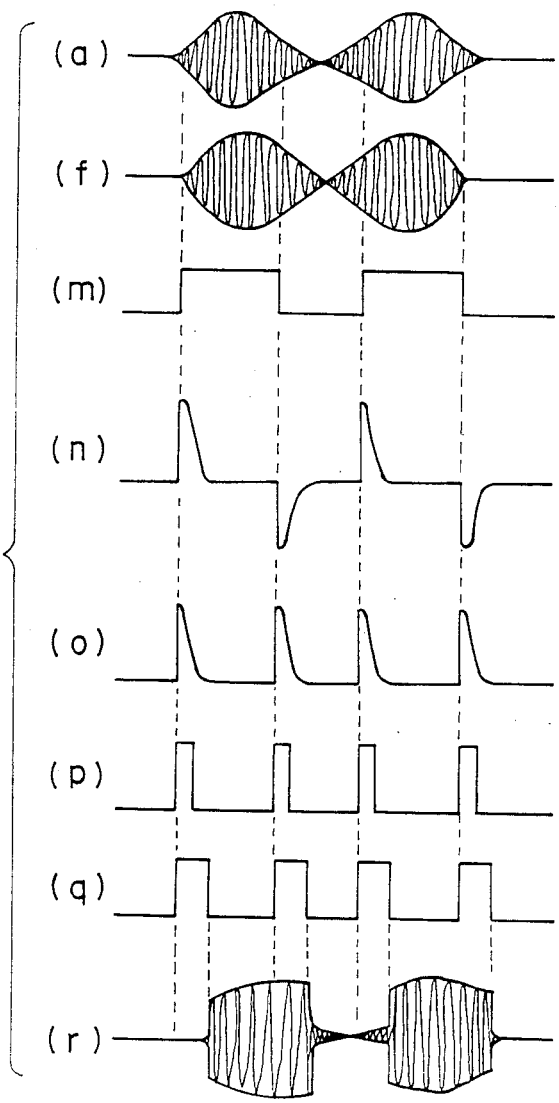
FIG. 11 shows signal waveforms for explaining a method for detecting an edge of color by using a luminance signal.

As described previously, in the case when detecting an edge of color is by using the chrominance signal, continual slight changes of colors cannot be separately detected, so that the detection signal may be obtained in a lump as shown in FIG. 4(d). In this case, it becomes difficult to emphasize fine differences in colors to reproduce a fine picture on the display. On the other hand, the luminance signal is a signal having a wide band width. For this reason, in the case where the circuit is designed so as to detect edges of colors by using the luminance signal, it is possible to enhance colors to thereby reproduce the fine picture. The above is described with reference to FIG. 11.

It is assumed that the chrominance signal and luminance signal have waveforms shown in FIGS. 11(a) and 11(m), respectively. A signal of FIG. 11(f) is a delayed chrominance signal obtained by delaying the chrominance signal in such a manner that an edge of the luminance signal is positioned at a corresponding rise or fall of the chrominance signal. A signal shown in FIG. 11(q) shows a pulse having a constant delay quantity from the edge of the luminance signal of FIG. 11(m). Color information on the carrier chrominance signal just prior to the edge of the luminance signal is held during the time when the pulse of FIG. 11(q) is maintained at "H". Thereby, a carrier chrominance signal of FIG. 11(r) can be obtained. It can be seen from FIG. 11(r) that the carrier chrominance signal can be steepened, so that a picture having continual slight color changes can be clearly reproduced on the display.

Figure 12:
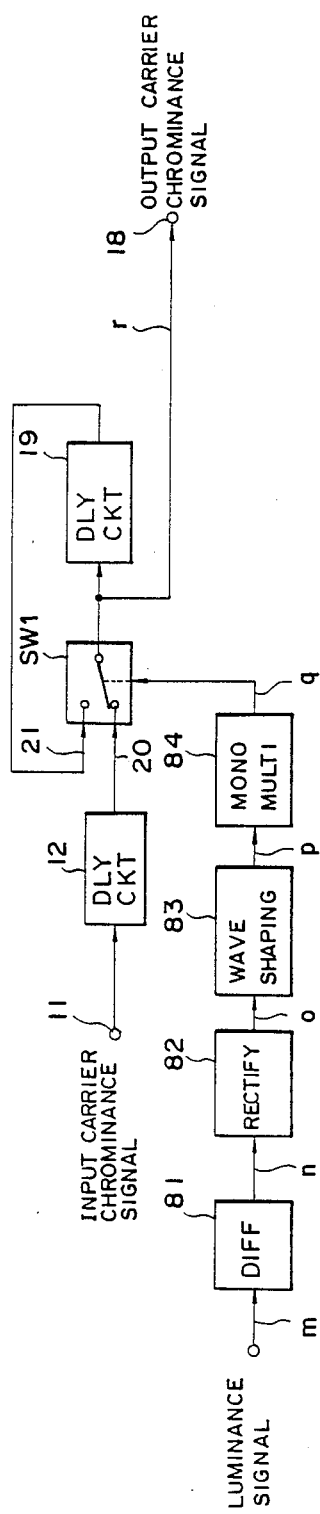
FIG. 12 is a block diagram of the fourth embodiment of the present invention.

FIG. 12 is a block diagram of an embodiment where the luminance signal is used for detecting an edge of the chrominance signal. The luminance signal having the waveform as shown in FIG. 11(m) is applied to a differentiation circuit 81. The differentiation circuit 81 may be constructed by a high-pass filter or a combination of a delay circuit and a subtractor such as the delay circuit 13 and the calculation circuit 14. An output of the differentiation circuit 81 which has the signal waveform as shown in FIG. 11(n) is supplied to a rectification circuit 82. An output of the rectification circuit 82 which has the signal waveform as shown in FIG. 11(o) is supplied to a waveform shaping circuit 83, which supplies a waveform-shaped signal which has the waveform as shown in FIG. 11(p) to a monostable multivibrator 84. An output signal having the waveform as shown in FIG. 11(q) is supplied to the switch SW1. The switch SW1 is controlled by the output signal of the monostable multivibrator 84.

A description is given of a video tape recorder in conformity with the low-frequency conversion color television system, into which the present invention is built.

Figure 13:
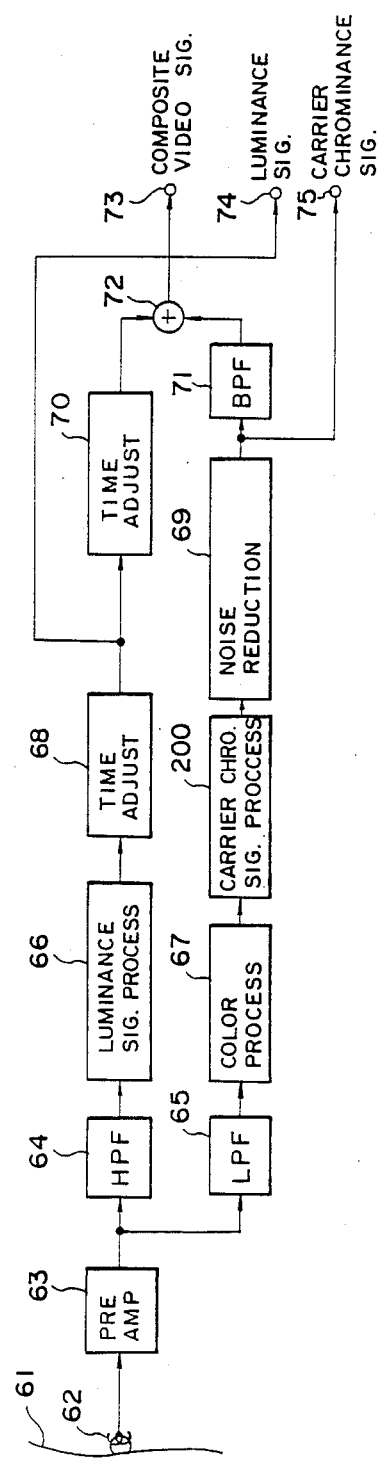
FIG. 13 is a block diagram of a video tape recorder in conformity of the low-frequency band conversion color television system to which the present invention is applied.

Referring to FIG. 13, a magnetic tape 61 is scanned by a magnetic head 62, which supplies a read signal to a pre-amplifier 63. The pre-amplifier 63 amplifies the output signal supplied from the head 62, and feeds an amplified signal to a high-pass filter 64 and a low-pass filter 65. The high-pass filter 64 is used for extracting the frequency-modulated luminance signal from the output of the pre-amplifier 63. The low-pass filter 65 is used for extractinq the chrominance signal, which has been frequency-converted to a low band, from the output of the pre-amplifier 63. An extracted luminance signal is supplied to a reproduction channel luminance signal processing circuit 66, where subjects the luminance signal to a conventional signal processing such as demodulation and de-emphasis. An output signal of the luminance signal processing circuit 66 is supplied to a delay circuit 68 for a time base correction. An output signal of the delay circuit 68 is supplied to a delay circuit 70 for time base correction and also to a luminance signal output terminal 74. An output signal of the delay circuit 70 is supplied to an input of an adder 72.

On the other hand, an extracted chrominance signal is subjected to a conventional color processing such as frequency conversion to an original band executed by a reproduction channel color processing circuit 67. An output signal of the color processing circuit 67 is fed to a carrier chrominance processing circuit 200 provided by the present invention. The carrier chrominance processing circuit 200 is constructed by one of the aforementioned embodiments of the present invention. The carrier chrominance processing circuit 200 is followed by a noise reduction circuit 69 based on a vertical correlation. The noise reduction circuit 69 may be constructed by a recursive type comb filter. When a signal-to-noise ratio of the signal used for detecting an edge of the carrier chrominance signal is small, the position of the beginning of the edge is fluctuated due to the presence of noise. Thereby, the position of color information to be held is also fluctuated due to the presence of noise. As a result, color irregularity appears on the display. The noise reduction circuit is useful to average the color irregularity. A noise-reduced output signal derived from the noise reduction circuit 69 is supplied to a band-pass filter 71 which is inserted into the chrominance signal channel followed by the adder 72 used for producing a composite video signal. The band-pass filter 71 is used for avoiding the occurrence of a side-band over a band width of the luminance signal which may be produced from the edge steepening process. The composite video signal is obtained at a composite video signal output terminal 73, and the carrier chrominance signal is obtained at a carrier chrominance signal output terminal 75.

The present invention is not limited to the above embodiments, and variations and modifications may be made without departing from the scope of the present invention.

What is claimed is:

1. A carrier chrominance signal processing circuit comprising;

first means for detecting an edge of color in an input carrier chrominance signal;

second means for holding color information on the input carrier chrominance signal in a vicinity of the edge of color;

third means for producing a control signal having a predetermined pulse width in response to the detected edge of color; and fourth means for selecting a held color information from said second means when the control signal is applied thereto so that a steepened carrier chrominance signal is outputted from the fourth means and for selecting the input carrier chrominance signal applicable to said second means for holding when no control signal is applied thereto.

2. A carrier chrominance signal processing circuit as claimed in claim 1, wherein the first means comprises first delay means for delaying the input carrier chrominance signal by a predetermined delay time, and calculation means for performing a predetermined calculation between an output signal of the first delay means and the input carrier chrominance signal, and wherein the third means comprises detection means for detecting a chrominance signal from an output signal of the calculation means, waveform shaping means for waveform-shaping an output signal of the detection means, and monostable multivibrator means for producing the control signal having the predetermined pulse width which is triggered by an output signal of the waveform shaping means.

3. A carrier chrominance signal processing circuit as claimed in claim 2, wherein the first delay means of the first means has a predetermined delay time which corresponds to one of an interger multiple of a period of a chrominance subcarrier signal and an odd number multiple of a half of the period of the chrominance subcarrier signal.

4. A carrier chrominance signal processing circuit as claimed in claim 2, wherein the calculation means comprises one of an adder and a subtractor.

5. A carrier chrominance signal processing circuit as claimed in claim 2, wherein the monostable multivibrator means is triggered in response to a rising edge of the output signal of the waveform shaping means.

6. A carrier chrominance signal processing circuit as claimed in claim 1, wherein the fourth means comprises first switching means having two input terminals, one output terminals and a control terminal, and wherein the two input terminals are supplied with the input carrier chrominance signal and the output signal of the second means, and the output terminal of the first switching means is connected to an input terminal of the second means, and wherein the control terminal of the first switching means is supplied with the control signal supplied from the third means.

7. A carrier chrominance signal process circuit as claimed in claim 6, the second means comprises second delay means for delaying an output signal of the first switching means by a predetermined delay time.

8. A carrier chrominance signal processing circuit as claimed in claim 7, further comprising sixth means for delaying the input carrier chrominance signal by a delay time identical to a delay time which is caused in the first and third means, seventh means for selecting one of an output signal of the sixth means and the held color information in response to the control signal produced by the third means.

9. A carrier chrominance signal processing circuit as claimed in claim 8, wherein the monostable multivibrator means is triggered in response to a trailing edge of the output signal of the waveform shaping means.

10. A carrier chrominance signal processing circuit as claimed in claim 1, further comprising fifth means for delaying the input carrier chrominance signal by a delay time identical to a delay time which is caused in the first and third means, so that a delayed input carrier chrominance signal is supplied to the second means.

11. A carrier chrominance signal processing circuit as claimed in claim 1, wherein the first means comprises a band-stop filter of a narrow hand width for suppressing a chrominance subcarrier signal contained in the input carrier chrominance signal.

12. A carrier chrominance signal processing circuit as claimed in claim 1, wherein said first means has a luminance signal applied thereto, said luminance signal being related to said input carrier chrominance signal, to produce an output signal related to said input carrier chrominance signal, and said third means derives said control signal from said output signal of said first means.

13. A carrier chrominance signal processing circuit as claimed in claim 1 wherein said second means includes means for holding first color information on the input carrier chrominance signal which is located immediately prior to the detected edge of color and second color information on the input carrier chrominance signal which is located in a rear portion of the detected edge of color, and said fourth means selects the held first and second color information during former and latter halves of the detected edge of color, respectively and selects the input carrier chrominance signal when no control signal is applied thereto.

14. A carrier chrominance signal processing circuit, comprising:
first means for detecting an edge of color in an input carrier chrominance signal;
second means for holding color information on the carrier chrominance signal in a vicinity of the edge of color;
third means for deriving a control signal having a predetermined pulse width from detected results from said first means; and
fourth means for selectively outputting one of either said color information from said second means or said input carrier chrominance signal in accordance with said control signal from said third means and for outputting said carrier chrominance signal having a steepened change corresponding to a change in luminance of color in said input chrominance signal.

* * * * *